(12) United States Patent
Hanlon et al.

(10) Patent No.: US 7,701,161 B2
(45) Date of Patent: Apr. 20, 2010

(54) MOTOR BALANCED ACTIVE USER INTERFACE ASSEMBLY

(75) Inventors: Casey Hanlon, Queen Creek, AZ (US);
James I. Kern, Phoenix, AZ (US);
Douglas C. Smith, Phoenix, AZ (US);
David Cowling, Bristol (GB)

(73) Assignees: Honeywell International Inc., Morristown, NJ (US); Wittenstein Aerospace & Simulation Ltd., Bristol (GB)

( * ) Notice: Subject to any disclaimer, the term of this patent is extended or adjusted under 35 U.S.C. 154(b) by 192 days.

(21) Appl. No.: 11/676,845

(22) Filed: Feb. 20, 2007

(65) Prior Publication Data

US 2008/0079381 A1 Apr. 3, 2008

Related U.S. Application Data

(60) Provisional application No. 60/848,942, filed on Oct. 2, 2006.

(51) Int. Cl.
*G05B 13/00* (2006.01)
(52) U.S. Cl. .................. 318/561; 318/568; 318/628
(58) Field of Classification Search .......... 318/561, 318/568, 628, 632, 560, 650; 901/1, 3, 5, 901/7, 9; 244/223
See application file for complete search history.

(56) References Cited

U.S. PATENT DOCUMENTS

| 2,475,484 | A | | 7/1949 | De Nise |
| 2,678,179 | A | | 5/1954 | Feeney et al. |
| 2,955,784 | A | | 10/1960 | Vogel et al. |
| 4,069,720 | A | | 1/1978 | Thor |
| 4,071,209 | A | | 1/1978 | Hart |
| 4,150,803 | A | | 4/1979 | Fernandez |
| 4,383,455 | A | | 5/1983 | Tuda et al. |
| 4,513,235 | A | | 4/1985 | Acklam et al. |
| 4,982,918 | A | | 1/1991 | Kaye |
| 5,107,080 | A | | 4/1992 | Rosen |
| 5,456,428 | A | | 10/1995 | Hegg |
| 5,473,235 | A | * | 12/1995 | Lance et al. ............ 318/561 |
| 6,459,228 | B1 | * | 10/2002 | Szulyk et al. ........... 318/632 |
| 6,644,600 | B1 | | 11/2003 | Olson et al. |
| 6,708,580 | B1 | | 3/2004 | Smith et al. |
| 2003/0030621 | A1 | | 2/2003 | Rosenberg et al. |
| 2006/0254377 | A1 | | 11/2006 | Henle |

FOREIGN PATENT DOCUMENTS

JP 857783 3/1996

OTHER PUBLICATIONS

Hermans, R.L. "Design of an actuated side stick controller for the Simona Research Simulator," Sep. 1999, pp. 1-154.

* cited by examiner

*Primary Examiner*—Karen Masih
(74) *Attorney, Agent, or Firm*—Ingrassia Fisher & Lorenz, P.C.

(57) ABSTRACT

An active user interface assembly includes a user interface, and one or more feedback motors coupled to the user interface. The one or more feedback motors, when energized, supply a feedback force to the user interface that opposes user interface movement. One of the feedback motors is disposed such that its center of gravity is located at a position relative to the user interface to mass balance the user interface when it is in the null position. The configurations allow for the center of gravity of a feedback motor to be positioned in a manner that alleviates the need for counterbalance weights.

20 Claims, 7 Drawing Sheets

MOTOR BALANCED ACTIVE USER INTERFACE ASSEMBLY

CROSS-REFERENCE TO RELATED APPLICATION

This application claims the benefit of U.S. Provisional Application No. 60/848,942, filed Oct. 2, 2006.

TECHNICAL FIELD

The present invention relates to user interfaces and, more particularly, to a user interface assembly that includes one or more motors to provide haptic feedback and that is mass balanced by a haptic feedback motor.

BACKGROUND

Aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw, and roll axes, and the secondary flight control surfaces are those that are used to influence the lift or drag (or both) of the aircraft. Although some aircraft may include additional control surfaces, the primary flight control surfaces typically include a pair of elevators, a rudder, and a pair of ailerons, and the secondary flight control surfaces typically include a plurality of flaps, slats, and spoilers.

The positions of the aircraft flight control surfaces are typically controlled using a flight control surface actuation system. The flight control surface actuation system, in response to position commands that originate from either the flight crew or an aircraft autopilot, moves the aircraft flight control surfaces to the commanded positions. In most instances, this movement is effected via actuators that are coupled to the flight control surfaces.

Typically, the position commands that originate from the flight crew are supplied via some type of input control mechanism. For example, many aircraft include two yoke and wheel type of mechanisms, one for the pilot and one for the co-pilot. Either mechanism can be used to generate desired flight control surface position commands. More recently, however, aircraft are being implemented with control stick type mechanisms, which may be implemented as either side sticks or center sticks. Most notably in aircraft that employ a fly-by-wire system. Similar to the traditional yoke and wheel mechanisms, it is common to include multiple control stick mechanisms in the cockpit, one for the pilot and one for the co-pilot.

Most control stick mechanisms are implemented with some type of mass balance, such as counterbalance weights, to alleviate a potentially large moment that may exist when an aircraft experiences accelerations resulting from longitudinal and lateral accelerations. These additional counterbalance weights can be undesirable in some instances. For example, the counterbalance weights, when included, are in addition to the mounting, control, and feedback hardware associated with the control stick mechanism. Thus, overall size envelope and weight may increase, which may result in a concomitant increase in costs.

Hence, there is a need for a flight control stick mechanism that is mass balanced, but does not increase, or at least significantly increase, overall control stick size and/or weight. The present invention addresses at least this need.

BRIEF SUMMARY

In one embodiment, and by way of example only, an active user interface assembly includes a housing, a user interface, and a feedback motor. The user interface is coupled to and extends from the housing, and is rotatable, from a null position, about an axis. The feedback motor is coupled to the user interface and is adapted to be selectively energized. The feedback motor is operable, upon being energized, to supply a feedback force to the user interface that opposes user interface movement about the axis. The feedback motor is disposed such that its center of gravity is located at a position relative to the user interface to mass balance the user interface when it is in the null position.

In another exemplary embodiment, an active user interface assembly includes a housing, a user interface, a first feedback motor, and a second feedback motor. The user interface is coupled to and extends from the housing, and is rotatable, from a null position, about a first axis and a second axis. The first and second axes are perpendicular. The first feedback motor is coupled to the user interface and is disposed such that its center of gravity is located at a first position relative to the user interface. The first feedback motor is adapted to be selectively energized and is operable, upon being energized, to supply a feedback force to the user interface that opposes user interface movement about the first axis. The second feedback motor is coupled to the user interface and is disposed such that its center of gravity is located at a second position relative to the user interface. The second feedback motor is adapted to be selectively energized and is operable, upon being energized, to supply a feedback force to the user interface that opposes user interface movement about the second axis. At least one of the first position and the second position are selected to mass balance the user interface when it is in the null position.

Other independent features and advantages of the preferred user interface assembly will become apparent from the following detailed description, taken in conjunction with the accompanying drawings which illustrate, by way of example, the principles of the invention.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background or the following detailed description. In this regard, although the inventive user interface assembly is described herein as being implemented in an aircraft flight control system, it will be appreciated that it can be implemented in numerous other systems and environments in which it is desirable to supply haptic feedback to a user.

Figure 1:
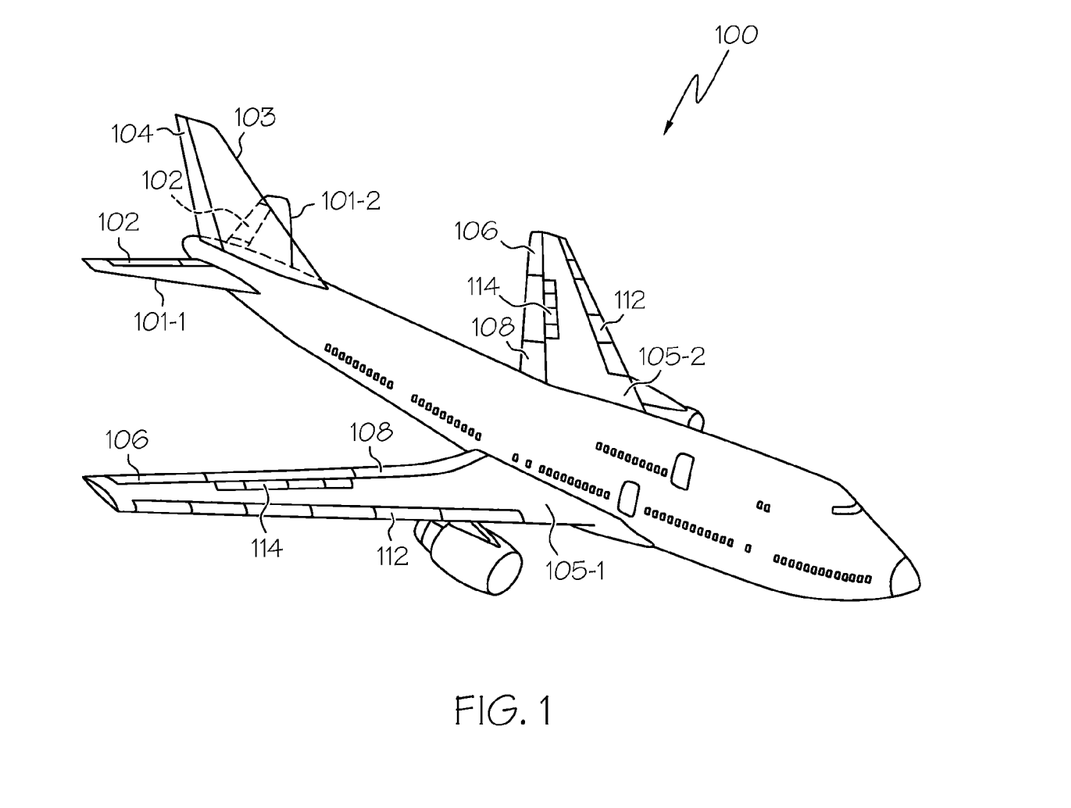
FIG. 1 is a perspective view of an exemplary aircraft depicting primary and secondary flight control surfaces.

Turning now to FIG. 1, a perspective view of an exemplary aircraft is shown. In the illustrated embodiment, the aircraft 100 includes first and second horizontal stabilizers 101-1 and 101-2, respectively, a vertical stabilizer 103, and first and second wings 105-1 and 105-2, respectively. An elevator 102 is disposed on each horizontal stabilizer 101-1, 101-2, a rudder 104 is disposed on the vertical stabilizer 103, and an aileron 106 is disposed on each wing 105-1, 105-2. In addition, a plurality of flaps 108, slats 112, and spoilers 114 are disposed on each wing 105-1, 105-2. The elevators 102, the rudder 104, and the ailerons 106 are typically referred to as the primary flight control surfaces, and the flaps 108, the slats 112, and the spoilers 114 are typically referred to as the secondary flight control surfaces.

The primary flight control surfaces 102-106 control aircraft movements about the aircraft pitch, yaw, and roll axes. Specifically, the elevators 102 are used to control aircraft movement about the pitch axis, the rudder 104 is used to control aircraft movement about the yaw axis, and the ailerons 106 control aircraft movement about the roll axis. It is noted, however, that aircraft movement about the yaw axis can also be achieved by varying the thrust levels from the engines on opposing sides of the aircraft 100. It will additionally be appreciated that the aircraft 100 could include horizontal stabilizers (not shown).

The secondary control surfaces 108-114 influence the lift and drag of the aircraft 100. For example, during aircraft take-off and landing operations, when increased lift is desirable, the flaps 108 and slats 112 may be moved from retracted positions to extended positions. In the extended position, the flaps 108 increase both lift and drag, and enable the aircraft 100 to descend more steeply for a given airspeed, and also enable the aircraft 100 get airborne over a shorter distance. The slats 112, in the extended position, increase lift, and are typically used in conjunction with the flaps 108. The spoilers 114, on the other hand, reduce lift and when moved from retracted positions to extended positions, which is typically done during aircraft landing operations, may be used as air brakes to assist in slowing the aircraft 100.

Figure 2:
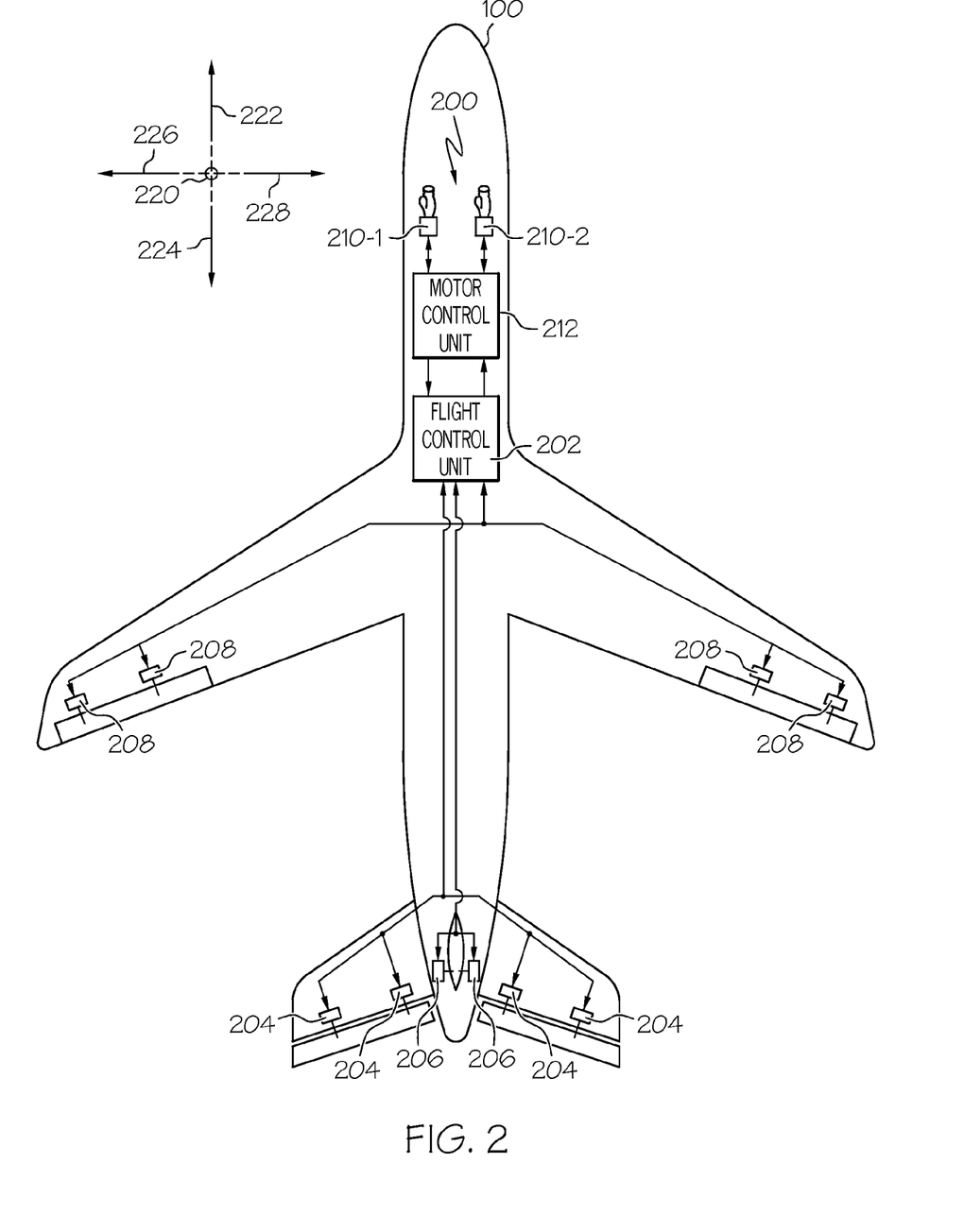
FIG. 2 is a schematic depicting portions of an exemplary flight control surface actuation system according one embodiment of the present invention.

The flight control surfaces 102-114 are moved to commanded positions via a flight control surface actuation system 200, an exemplary embodiment of which is shown in FIG. 2. In the depicted embodiment, the flight control surface actuation system 200 includes one or more control units 202, a plurality of primary flight control surface actuators, which include elevator actuators 204, rudder actuators 206, and aileron actuators 208. It will be appreciated that the system 200 is preferably implemented with more than one control unit 202. However, for ease of description and illustration, only a single, multi-channel control unit 202 is depicted. It will additionally be appreciated that one or more functions of the control unit 202 could be implemented using a plurality of devices.

Before proceeding further, it is noted that the flight control surface actuation system 200 additionally includes a plurality of secondary control surface actuators, such as flap actuators, slat actuators, and spoiler actuators. However, the operation of the secondary flight control surfaces 108-114 and the associated actuators is not needed to fully describe and enable the present invention. Thus, for added clarity, ease of description, and ease of illustration, the secondary flight control surfaces and actuators are not depicted in FIG. 2, nor are these devices further described.

Returning now to the description, the flight control surface actuation system 200 may additionally be implemented using various numbers and types of primary flight control surface actuators 204-208. In addition, the number and type of primary flight control surface actuators 204-208 per primary flight control surface 102-106 may be varied. In the depicted embodiment, however, the system 200 is implemented such that two primary flight control surface actuators 204-208 are coupled to each primary flight control surface 102-106. Moreover, each of the primary flight control surface actuators 204-208 are preferably a linear-type actuator, such as, for example, a ballscrew actuator. It will be appreciated that this number and type of primary flight control surface actuators 204-208 are merely exemplary of a particular embodiment, and that other numbers and types of actuators 204-208 could also be used.

No matter the specific number, configuration, and implementation of the control units 202 and the primary flight control surface actuators 204-208, the control unit 202 is configured to receive aircraft flight control surface position commands from one or more input control mechanisms. In the depicted embodiment, the system 200 includes two user interfaces, a pilot user interface 210-1 and a co-pilot user interface 210-2, and one or more motor control units 212. As will be described in more detail below, the pilot 210-1 and co-pilot 210-2 user interfaces are both implemented as flight control sticks. It will be appreciated that in some embodiments, the system 200 could be implemented with more or less than this number of flight control sticks 210. It will additionally be appreciated that the system could be implemented with more than one motor control unit 212, and that the flight control unit 202 and motor control unit 212 could be integrated into a single device. Nonetheless, the motor control unit 212, in response to position signals supplied from one or both flight control sticks 210, supplies flight control surface position signals to the flight control unit 202. The flight control unit 202, in response to the flight control surface position signals, supplies power to the appropriate primary flight control surface actuators 204, 208, to move the appropriate primary flight control surfaces 102, 106 to positions that will cause the aircraft 100 to implement the commanded maneuver. Preferably, though not necessarily, a separate non-depicted rudder pedal is included to control the rudder actuators 206, and thus the position of the rudder 104.

Figure 3:
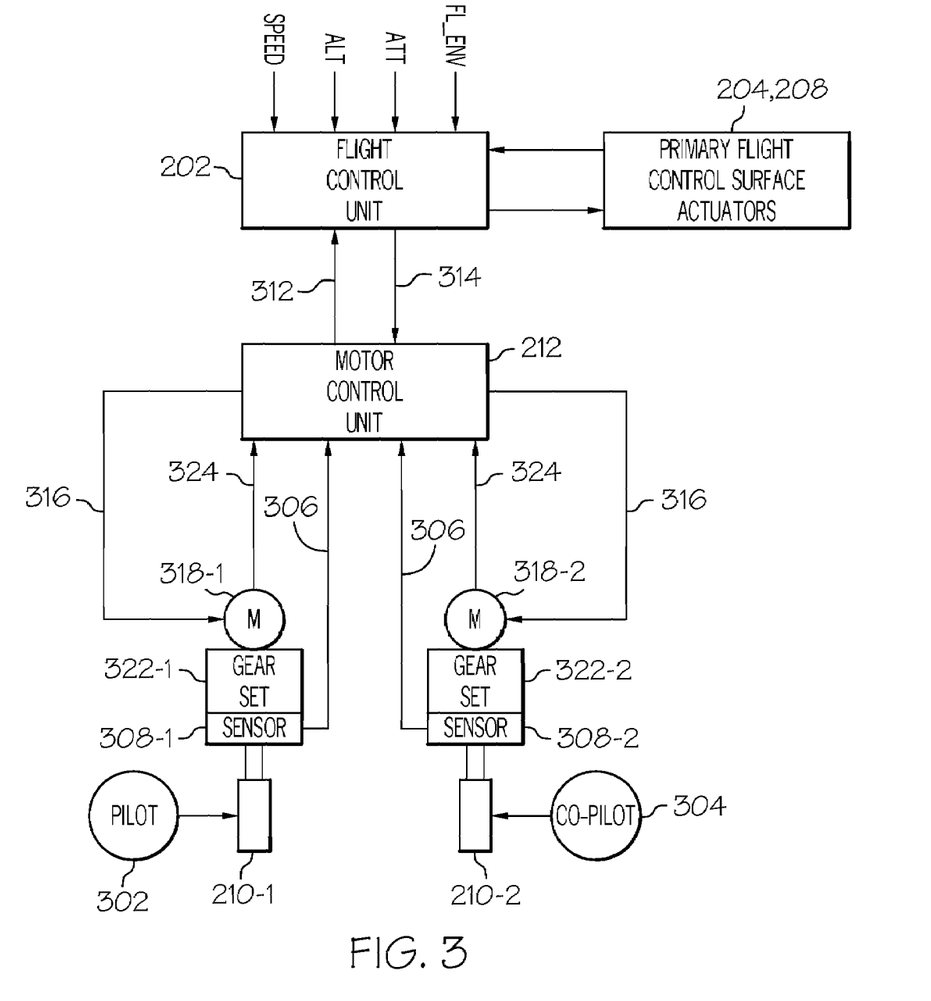
FIG. 3 is a functional block diagram of the flight control surface actuation system of FIG. 2, depicting certain portions thereof in slightly more detail.

Turning now to FIG. 3, which is also a functional block diagram of the flight control surface actuation system 200 depicting portions thereof in slightly more detail, the flight control sticks 210 are each configured to move, in response to input from either a pilot 302 or a co-pilot 304, to a control position in a displacement direction. Although the configuration of the flight control sticks 210 may vary, in the depicted embodiment, and with quick reference back to FIG. 2, each flight control stick 210 is configured to be movable, from a null position 220, to a control position in a forward direction 222, an aft direction 224, a port direction 226, a starboard direction 228, a combined forward-port direction, a combined forward-starboard direction, a combined aft-port direction, or a combined aft-starboard direction, and back to or through the null position 220. It will be appreciated that flight control stick movement in the forward 222 or aft 224 direction causes the aircraft 100 to implement a downward or upward pitch maneuver, respectively, flight control stick movement in the port 226 or starboard 228 direction causes the aircraft 100 to implement a port or starboard roll maneuver, respectively, flight control stick movement in the combined forward-port or forward-starboard direction, causes the aircraft 100 to implement, in combination, a downward pitch and either a port or a starboard roll maneuver, respectively, and flight control stick movement in the combined aft-port or aft-starboard direction, causes the aircraft 100 to implement, in combination, an upward pitch and either a port or a starboard roll maneuver, respectively.

Returning once again to FIG. 3, the flight control sticks 210 are each configured to supply a control signal 306 to the motor control unit 212 that is representative of its position. To do so, a sensor 308 (e.g., 308-1, 308-2) is coupled to each flight control stick 210. The sensors 308 may be implemented using any one of numerous types of force and/or position sensors. The motor control unit 212, upon receipt of the control signals 306, supplies flight control surface position signals 312 to the flight control unit 202, which in turn supplies power to the appropriate primary flight control surface actuators 204, 208, to move the appropriate primary flight control surfaces 102, 106 to the appropriate positions, to thereby implement a desired maneuver. As FIG. 3 additionally depicts, the motor control unit 212 may receive one or more force feedback influence signals 314 from the flight control unit 202, and supplies motor drive signals 316 to a pilot motor 318-1, a co-pilot motor 318-2, or both.

The motors 318, which are each coupled to one of the flight control sticks 210 via associated gear sets 322 (e.g., 322-1, 322-2), are each operable, upon receipt of motor drive signals 316, to supply a feedback force to the associated flight control stick 210. It will be appreciated that, at least in some embodiments, the motor drive signals 316 may be variable in magnitude, based on the position of the flight control sticks 210, the slew rate of the flight control sticks 210, and various aircraft and control surface conditions, as represented by the one or more feedback influence signals 314. The motor drive signals 316 supplied to the pilot flight control stick 210-1 may also be variable in magnitude based on the position of the co-pilot flight control stick 210-2, and vice-versa. The flight control stick 210, in response to the feedback force supplied from the motor 318, supplies haptic feedback to the pilot 302 or co-pilot 304, as the case may be. Preferably, current feedback signals 324 are supplied to the motor control unit 212. Moreover, in a particular preferred embodiment, in which the motors 318 are implemented as brushless DC motors, current feedback and commutation signals 324 are supplied to the motor control unit 212.

Before proceeding further, it is noted that only a single pilot motor 318-1 and gear set 322-1 and a single co-pilot motor 318-2 and gear set 322-2 are shown in FIG. 3. It will be appreciated that this is done merely for clarity and ease of depiction and description, and that the system 200 would likely be implemented with two pilot motors 318-1 and gear sets 322-1 and two co-pilot motors 318-2 and gear sets 322-2. With two motors 318 and gear sets 322 associated with each flight control stick 210, feedback force can be supplied along two orthogonal axes.

Figure 4:
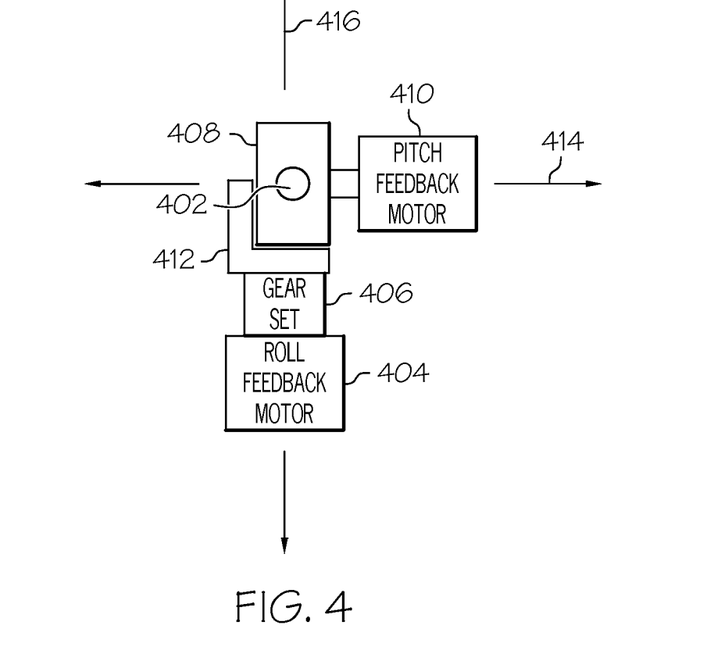
FIGS. 4 and 5 are simplified top and side view representations, respectively, of an exemplary user interface assembly that may be implemented as a flight control stick mechanism.
Figure 5:
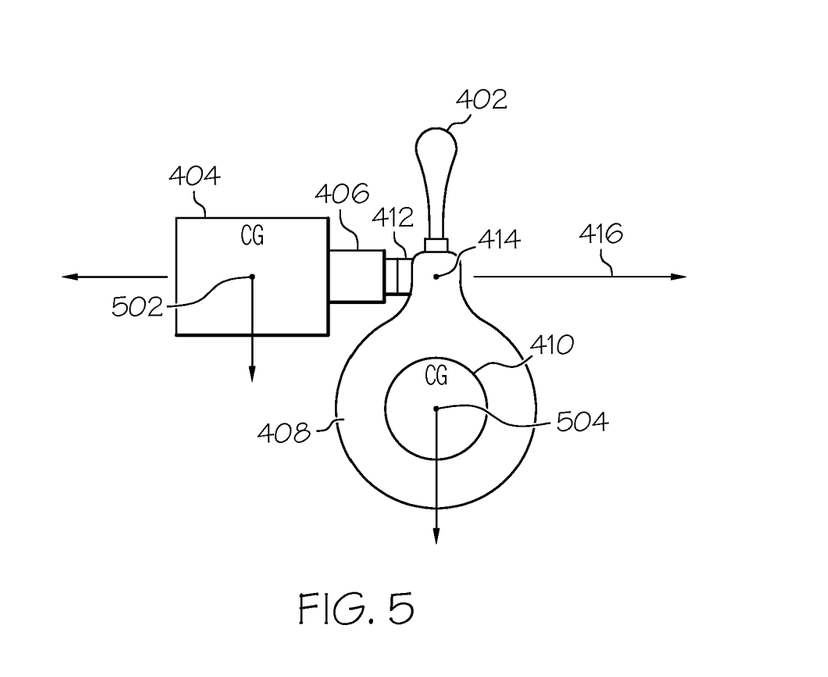

Returning to the description and with reference now to FIGS. 4 and 5, a simplified representation of a user interface assembly that may be used to implement one of the flight control sticks 210 is depicted. The depicted flight control stick 210 is implemented with two motors, as mentioned above, and includes a user interface 402, a roll feedback motor 404, a roll feedback gear set 406, a pitch feedback gear housing 408, a pitch feedback motor 410, and an interface mechanism 412. The user interface 402 is coupled to the pitch feedback gear housing 408, which is mounted to rotate about a pitch axis 414 and a roll axis 416. The roll feedback motor 404 is coupled, via the roll feedback gear set 406, to the interface mechanism 412, which is in turn coupled to the pitch feedback gear housing 408. The roll feedback motor 404 is disposed such that its center of gravity (CG) is located at a first position 502 relative to the user interface 402 (see FIG. 5). The roll feedback motor 404 is coupled to receive motor drive signals, such as the above-described motor drive signals 316 that are supplied from the motor control unit 212, and supplies roll feedback to the user interface 402, via the roll feedback gear set 406, the interface mechanism 412, and the pitch feedback gear housing 406.

The pitch feedback motor 410 is coupled to gears that are disposed within the pitch feedback gear housing 408. The pitch feedback motor 410 is also coupled to receive motor drive signals, such as the above-described motor drive signals 316 that are supplied from the motor control unit 212, and supplies feedback to the user interface 402, via a pitch feedback gear set that is disposed, at least partially, within the pitch feedback gear housing 408. The pitch feedback gear set is configured such that the pitch feedback motor 410 has a rotational axis that does not intersect that of the roll feedback motor 404, and such that the center of gravity (CG) of the pitch feedback motor 410 is located at a second position 504 relative to the user interface 402 (see FIG. 5). Preferably, the first position 502 is located on the pitch axis 416, whereas the second position 504 is offset from the pitch axis center of rotation and is selected such that the user interface 402 is mass balanced when it is in the null position 220 (see FIG. 2).

Figure 6:
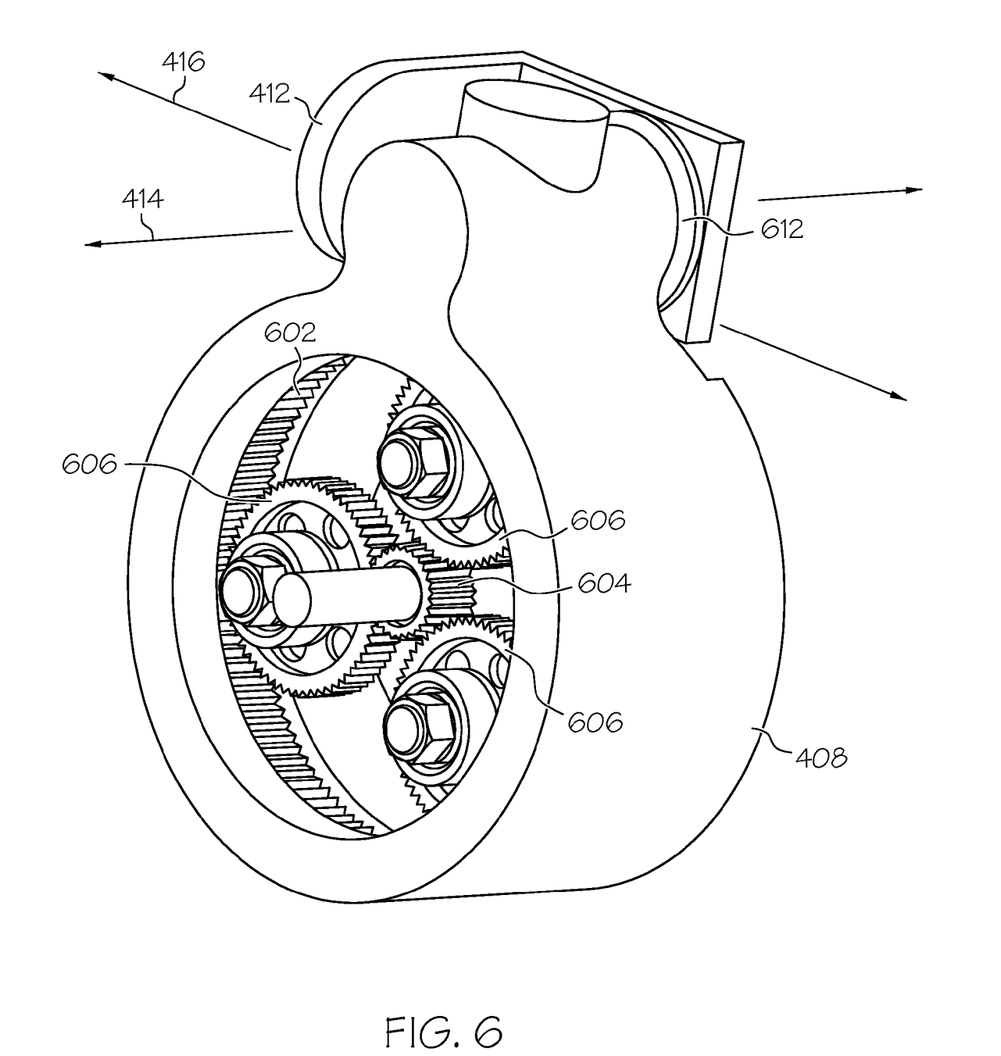
FIGS. 6-8 are exemplary gear set configurations for a flight control stick mechanism.
Figure 7:
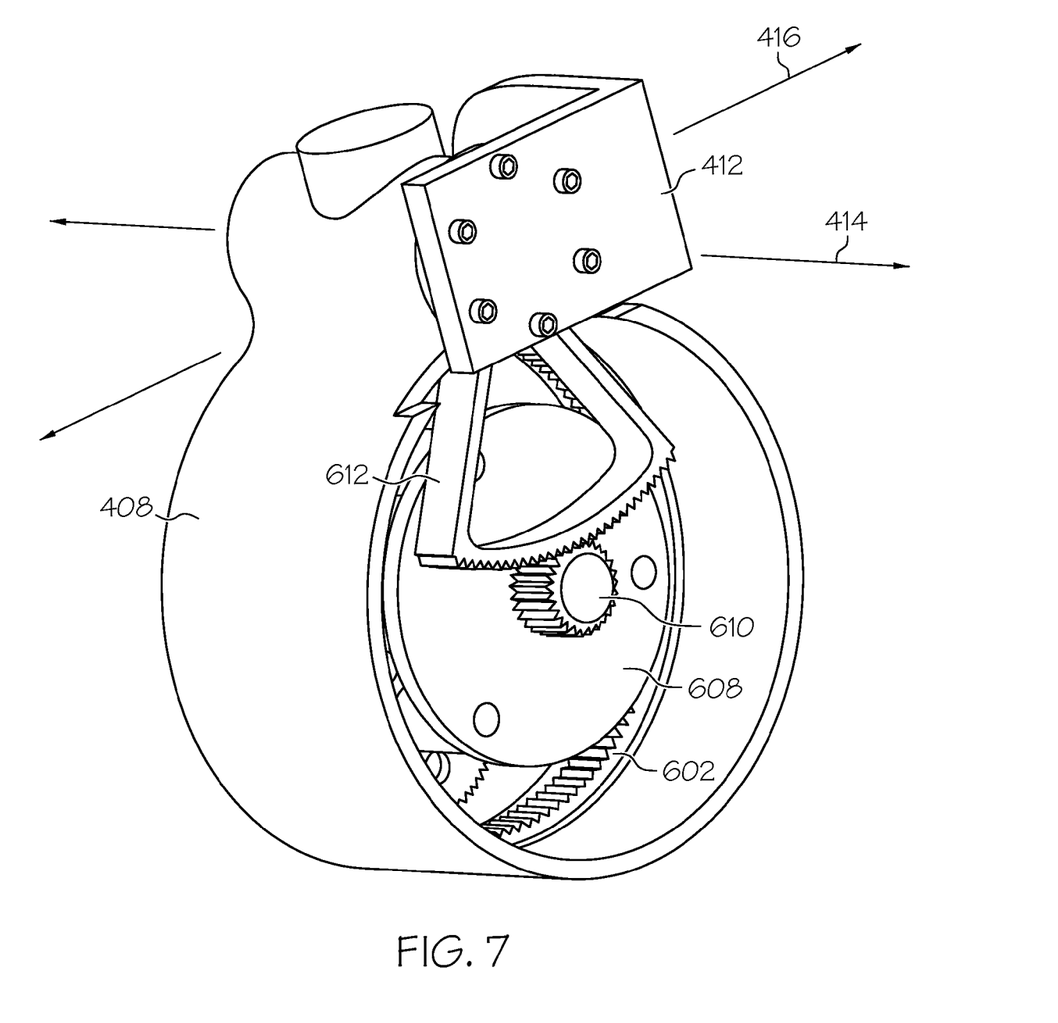
Figure 8:
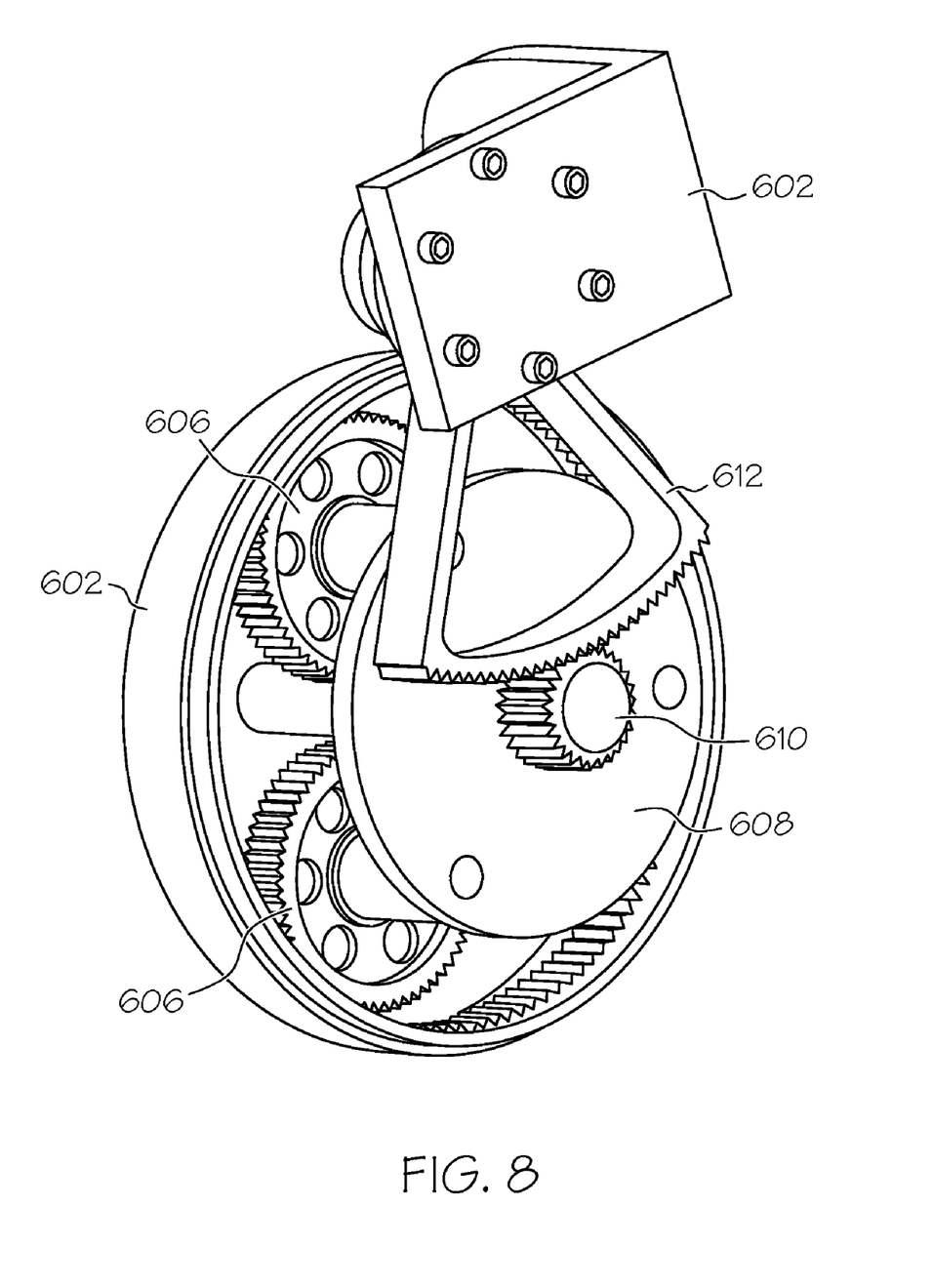

Turning now to FIGS. 6-8, an exemplary embodiment of the pitch feedback gear set is depicted, and includes a ring gear 602, a sun gear 604, a plurality of planet gears 606, a planet carrier 608, a planet carrier gear 610, and a sector gear 612. The ring gear 602 is coupled to the pitch feedback gear housing 406. The sun gear 604 is coupled to, and receives the feedback force supplied by, the pitch feedback motor 410 (not shown in FIGS. 6-8). The planet gears 606 are rotationally mounted on the planet gear carrier 608 and each meshes with the ring gear 602 and the sun gear 604. The planet carrier gear 610 is coupled to the planet carrier 608, and meshes with the sector gear 612, which is in turn coupled to the interface mechanism 412. Thus, when the pitch feedback motor 410 supplies a feedback force to the sun gear 604, the feedback force is transferred to the user interface 402 via the planet carrier 608, the planet carrier gear 610, the sector gear 612, and the interface mechanism 412.

The interface mechanism 614, at least in the depicted embodiment, is implemented using an L-bracket configuration, and is coupled between the roll feedback gear set 406 and the pitch feedback gear housing 408. More specifically, at least in the depicted embodiment, the interface mechanism 412 is coupled between the roll feedback gear set 406 and the sector gear 612. Thus, the interface mechanism 412 is mounted to about the pitch axis and to not rotate about the roll axis. It will be appreciated that the depicted L-bracket configuration is merely exemplary of a particular interface mechanism configuration, and that various other interface mechanism configurations could be used.

The configurations depicted in FIGS. 4-7 and described above are useful for user interface assemblies that can rotate about at least two axes of rotation. However, other user interface assemblies may be configured to rotate only a single axis of rotation. It will be appreciated that the concepts described above for mass balancing multiple axis of rotation user interfaces can also be applied to user interfaces that only rotate about a single axis of rotation.

The configurations depicted and described herein allow for the center of gravity of a feedback motor to be positioned in a manner that alleviates the need for counterbalance weights.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof.

The invention claimed is:

1. An active user interface assembly, comprising:
   a housing;
   a user interface coupled to and extending from the housing, the user interface rotatable, from a null position, about an axis; and
   a feedback motor coupled to the user interface and adapted to be selectively energized, the feedback motor operable, upon being energized, to supply a feedback force to the user interface that opposes user interface movement about the axis, the feedback motor disposed such that its center of gravity is located at a position relative to the user interface to mass balance the user interface when it is in the null position.

2. The assembly of claim 1, further comprising:
   a feedback gear set coupled between the feedback motor and the user interface.

3. The assembly of claim 2, wherein the feedback gear set is disposed at least partially within the housing.

4. The assembly of claim 2, wherein the feedback gear set comprises:
   a ring gear coupled to the housing;
   a plurality of planet gears, each planet gear meshed with the ring gear;
   a sun gear meshed with each of the planet gears and coupled to the feedback motor.

5. The assembly of claim 4, further comprising:
   a planet carrier having each of the planet gears rotationally disposed thereon;
   a carrier gear coupled to the planet carrier; and
   a sector gear meshed with the carrier gear and coupled to the user interface.

6. The assembly of claim 5, wherein the sector gear is coupled to the user interface via the housing.

7. An active user interface assembly, comprising:
   a housing;
   a user interface coupled to and extending from the housing, the user interface rotatable, from a null position, about a first axis and a second axis, the first and second axes being perpendicular;
   a first feedback motor coupled to the user interface and disposed such that its center of gravity is located at a first position relative to the user interface, the first feedback motor adapted to be selectively energized and operable, upon being energized, to supply a feedback force to the user interface that opposes user interface movement about the first axis;
   a second feedback motor coupled to the user interface and disposed such that its center of gravity is located at a second position relative to the user interface, the second feedback motor adapted to be selectively energized and operable, upon being energized, to supply a feedback force to the user interface that opposes user interface movement about the second axis,
   wherein at least one of the first position and the second position are selected to mass balance the user interface when it is in the null position.

8. The assembly of claim 7, further comprising:
   a first feedback gear set coupled between the first feedback motor and the user interface.

9. The assembly of claim 8, wherein the first feedback motor gear set is disposed at least partially within the housing.

10. The assembly of claim 8, wherein the first feedback gear set comprises:
    a ring gear coupled to the housing;
    a plurality of planet gears, each planet gear meshed with the ring gear;
    a sun gear meshed with each of the planet gears and coupled to the feedback motor.

11. The assembly of claim 10, further comprising:
    a planet carrier having each of the planet gears rotationally disposed thereon;
    a carrier gear coupled to the planet carrier; and
    a sector gear meshed with the carrier gear and coupled to the user interface.

12. The assembly of claim 11, wherein the sector gear is coupled to the user interface via the housing.

13. The assembly of claim 8, further comprising:
    a second feedback gear set coupled between the second feedback motor and the user interface.

14. The assembly of claim 13, further comprising:
    an interface mechanism coupled between the second feedback gear set and the user interface.

15. The assembly of claim 14, wherein the interface mechanism is:
    coupled to the user interface via the housing; and
    configured to rotate about the first axis and to not rotate about the second axis.

16. The assembly of claim 14, wherein the first feedback gear set comprises:
    a ring gear coupled to the housing;
    a planet carrier;
    a plurality of planet gears rotationally disposed on the planet carrier, each planet gear meshed with the ring gear;
    a sun gear meshed with each of the planet gears and coupled to the feedback motor;
    a carrier gear coupled to the planet carrier; and
    a sector gear meshed with the carrier gear and coupled to the user interface.

17. The assembly of claim 16, wherein the sector gear is coupled to the user interface via the interface mechanism.

18. An active user interface assembly, comprising:
    a housing;
    a user interface coupled to and extending from the housing, the user interface rotatable, from a null position, about a first axis and a second axis, the first and second axes being perpendicular;
    a first feedback motor disposed such that its center of gravity is located at a first position relative to the user interface, the first feedback motor adapted to be selectively energized and operable, upon being energized, to supply a feedback force that opposes user interface movement about the first axis;
    a first feedback gear set coupled between the first feedback motor and the user interface and configured to transfer the feedback force supplied by the first feedback motor to the user interface;
    a second feedback motor disposed such that its center of gravity is located at a second position relative to the user interface, the second feedback motor adapted to be selectively energized and operable, upon being energized, to supply a feedback force that opposes user interface movement about the second axis; and
    a second feedback gear set coupled between the second feedback motor and the user interface and configured to transfer the feedback force supplied by the second feedback motor to the user interface,
wherein the first position and the second position are selected to mass balance the user interface when it is in the null position.

19. The assembly of claim 18, wherein the first feedback gear set comprises:
a ring gear coupled to the housing;
a planet carrier;
a plurality of planet gears rotationally disposed on the planet carrier, each planet gear meshed with the ring gear;
a sun gear meshed with each of the planet gears and coupled to the feedback motor;
a carrier gear coupled to the planet carrier; and
a sector gear meshed with the carrier gear and coupled to the user interface.

20. An active user interface assembly, comprising:
a housing;
a user interface coupled to and extending from the housing, the user interface rotatable, from a null position, about an axis; and
a feedback motor coupled to the user interface and adapted to be selectively energized, the feedback motor operable, upon being energized, to supply a feedback force to the user interface that opposes user interface movement about the axis,
wherein:
the feedback motor is disposed such that its center of gravity is located at a position relative to the user interface to mass balance the user interface when it is in the null position, and
the feedback motor is coupled to the user interface such that, for a given torque generated by the feedback motor, the feedback force supplied to the user interface is substantially constant regardless of user interface position.

* * * * *